(12) United States Patent
Huber et al.

(10) Patent No.: US 8,342,921 B2
(45) Date of Patent: Jan. 1, 2013

(54) AIRCRAFT AIR CONDITIONING SYSTEM WITH CYCLONE DISCHARGERS

(75) Inventors: Alfred Huber, Maselheim (DE); Jacek Kogut, Munich (DE); Thomas Treimer, Laupheim (DE); Slawa Babak, Laupheim (DE)

(73) Assignee: Airbus Deutschland GmbH, Hamburg (DE)

( * ) Notice: Subject to any disclaimer, the term of this patent is extended or adjusted under 35 U.S.C. 154(b) by 1079 days.

(21) Appl. No.: 12/278,631

(22) PCT Filed: Feb. 6, 2007

(86) PCT No.: PCT/EP2007/000998
§ 371 (c)(1),
(2), (4) Date: Nov. 18, 2008

(87) PCT Pub. No.: WO2007/090608
PCT Pub. Date: Aug. 16, 2007

(65) Prior Publication Data
US 2010/0009617 A1    Jan. 14, 2010

(30) Foreign Application Priority Data
Feb. 7, 2006   (DE) .................... 10 2006 005 543

(51) Int. Cl.
*B64D 13/00* (2006.01)
*F24F 13/04* (2006.01)
(52) U.S. Cl. .......................................... 454/76
(58) Field of Classification Search ............ 454/76
See application file for complete search history.

(56) References Cited

U.S. PATENT DOCUMENTS

| | | | | |
|---|---|---|---|---|
| 2,374,708 A | * | 5/1945 | Shoults | 454/76 |
| 3,031,825 A | * | 5/1962 | Fourniere | 454/49 |
| 3,611,679 A | | 5/1968 | Pall | |
| 3,827,679 A | * | 8/1974 | Kaelin | 261/91 |
| 4,311,008 A | * | 1/1982 | Yamada | 60/602 |
| 4,517,813 A | | 5/1985 | Eggebrecht et al. | |
| 4,942,739 A | | 7/1990 | Uda et al. | |

(Continued)

FOREIGN PATENT DOCUMENTS
CH    585375    2/1977
(Continued)

OTHER PUBLICATIONS

Katzarov, CH 585,375, Feb. 28, 1977, English machine translation.*

(Continued)

*Primary Examiner* — Steven B McAllister
*Assistant Examiner* — Phillip E Decker
(74) *Attorney, Agent, or Firm* — Wood, Herron & Evans, LLP

(57) ABSTRACT

An aircraft air conditioning system includes a cyclone unit positioned proximate to at least one discharger, the unit having an inlet opening, which communicates with a fresh air supply line, an intake opening, through which air is sucked in from the aircraft cabin, and at least one outlet opening, which communicates with the at least one discharger. A first, cyclone flow of only fresh air is produced in the cyclone unit during operation of the aircraft air conditioning system, the first cyclone flow tending to draw cabin air into the cyclone unit via the intake opening for mixture with the fresh air, after which a second cyclone flow of the cabin air and fresh air are expelled through the outlet opening and the at least one discharger.

13 Claims, 3 Drawing Sheets

U.S. PATENT DOCUMENTS

| | | | |
|---|---|---|---|
| 6,210,109 B1* | 4/2001 | Will et al. | 415/204 |
| 7,780,423 B2* | 8/2010 | Liang | 417/423.15 |
| 7,828,640 B2* | 11/2010 | Liang | 454/76 |
| 2005/0061913 A1 | 3/2005 | McColgan et al. | |
| 2005/0091913 A1 | 5/2005 | Aradi et al. | |
| 2005/0132678 A1 | 6/2005 | Gemmati | |

FOREIGN PATENT DOCUMENTS

| | | |
|---|---|---|
| DE | 3526760 A1 | 2/1987 |
| DE | 3711520 A1 | 4/1988 |
| DE | 19728595 C1 | 9/1998 |
| RU | 2269064 | 1/2006 |
| SU | 573680 | 9/1977 |

OTHER PUBLICATIONS

International Search Report, PCT Form Nos. PCT/ISA/220 (Notification of Transmittal), PCT/ISA/210 (International Search Report), and PCT/ISA/237 (Written Opinion).

Russian Patent Office, Decision on Granting on Application No. 2008131477, Nov. 7, 2010.

* cited by examiner

AIRCRAFT AIR CONDITIONING SYSTEM WITH CYCLONE DISCHARGERS

TECHNICAL FIELD

The present invention relates to an aircraft air conditioning system with at least one fresh air supply line for conveying fresh air into an aircraft cabin, wherein the fresh air is blown out into the aircraft cabin via at least one discharger. In this respect "fresh air" means air which has not yet been in the aircraft cabin. The fresh air usually comes from a so-called AGU (air generation unit), i.e. an air treatment system which, using engine bleed air, provides suitably conditioned fresh air which can be routed into the aircraft cabin. In the present case the term "aircraft cabin" is understood to be the interior of an aircraft cabin. This may be the pilot's cockpit, the passenger compartment and/or the cargo compartment.

BACKGROUND

In order to reduce the amount of fresh air required for the aircraft cabin, it is known to recirculate a certain proportion of the air which is contained in the aircraft cabin, i.e. to withdraw this proportion from the aircraft cabin, to treat it and then to return it to the aircraft cabin, usually together with the fresh air which is in any case continuously supplied to the aircraft cabin. For this purpose the recirculated air must be mixed with the fresh air, which usually takes place at a central location, for example in a mixer connected downstream of the central air treatment unit (AGU). This obviously requires long line paths, which not only increase the production costs of an aircraft, but also take up installation space and have weight-increasing consequences.

The object of the invention is therefore to provide an improved aircraft air conditioning system which eliminates the above-mentioned problems.

SUMMARY

Starting out from a generally known aircraft air conditioning system as initially mentioned, this object is achieved according to the invention in that a cyclone unit is disposed in the vicinity of the discharger, wherein the unit has an inlet opening, which communicates with the fresh air supply line, an intake opening, through which air is sucked in from the aircraft cabin, and at least one outlet opening, which communicates with the at least one discharger, wherein a cyclone flow is produced in the cyclone unit during operation of the aircraft air conditioning system by means of the fresh air serving as incoming air and further wherein air is sucked in through the intake opening from the aircraft cabin and expelled together with the fresh air through the outlet opening. The system according to the invention therefore needs long lines merely for the fresh air which is to be supplied, while the air which is taken from the aircraft cabin and is to be recirculated is mixed with the fresh air and can optionally also be cleaned locally in the cyclone unit. The system according to the invention therefore saves weight and requires little production and assembly expenditure. Moreover, it has a form which is optimized in flow terms.

Here the words "in the vicinity of the discharger" mean that the cyclone unit does not represent a central mixing unit which is responsible for delivering air to all of the dischargers in the aircraft, but instead that the cyclone unit is associated with one discharger or a few dischargers located in close relation proximate to the cyclone unit to thereby define a subset of the dischargers (i.e., not all of the dischargers) in the aircraft. The the intake opening of the cyclone which unit communicates with the aircraft cabin either directly or via a short intake duct. In the simplest case the discharger is a component which defines an outflow opening. In a further developed form the discharger may have one or more guide vanes which span the outflow opening in order to distribute the outflowing air in a more uniform manner and/or to direct it in a certain direction.

According to a preferred embodiment, a main body of the cyclone unit is of horizontally split construction and comprises an upper part, which in its central region defines the outlet opening, and a lower part, which, together with the upper part, defines a toroidal hollow space whose radially inner wall is formed by a hollow truncated cone extending from the lower part upwards into the region of the outlet opening. A cyclone flow is produced in the toroidal hollow space by introducing the incoming air tangentially. An embodiment of this kind is inexpensive to manufacture and easy to assemble.

The maximum cross section of the hollow truncated cone preferably forms the intake opening in the above-mentioned embodiment. As stated, the intake opening may either suck in air directly from the aircraft cabin, for example in the cargo compartment of an aircraft, in which the cyclone unit can be disposed without being concealed, or it may communicate with a short intake duct via which the air is sucked in from, for example, a passenger compartment of a commercial aircraft. In the latter case the cyclone unit is preferably fitted in a concealed manner, for example behind covering panels of the aircraft cabin. If the intake opening communicates directly with the aircraft cabin, a protective grille preferably spans the intake opening cross section in order to prevent undesirable parts from penetrating into the cyclone unit.

As already mentioned, the outlet opening of the cyclone unit may also communicate with two or more dischargers instead of with one. Particularly when the outlet opening communicates with more than one discharger, each discharger communicates with the outlet opening through an exhaust line. When compared with the lines required in an air conditioning system having a central mixing unit, these exhaust lines are also very short, and their length may correspond approximately to the length of the intake duct, if such an intake duct is provided.

In an embodiment in which each discharger communicates with the outlet opening of the cyclone unit through a exhaust line, each exhaust line preferably opens out by way of its end which is opposite the discharger in a distributor element which communicates directly with the outlet opening of the cyclone unit. A plurality of dischargers can in this way be supplied in a space-saving manner by means of one and the same cyclone unit. According to a preferred configuration, the distributor element comprises a toroidal body with a central opening which establishes the communication with the outlet opening of the cyclone unit, and the exhaust lines extend radially outwards from the toroidal body. The cyclone flow which is initially produced in the cyclone unit is maintained in a distributor element of this kind, so that the fresh air which is mixed with the recirculated air can be uniformly distributed to the individual dischargers. In a structurally advantageous manner, each exhaust line is preferably of horizontally split formation, and can therefore be easily implemented, e.g. as an injection-moulded part, and easily assembled.

If desired, the cyclone unit may at the same time serve as a separator for particles contained in the air without a high additional structural expenditure.

BRIEF DESCRIPTION OF THE DRAWINGS

An embodiment of a cyclone unit according to the invention for an aircraft air conditioning system is illustrated in detail in the following on the basis of the accompanying, schematic figures, in which.

DETAILED DESCRIPTION

Figure 1:
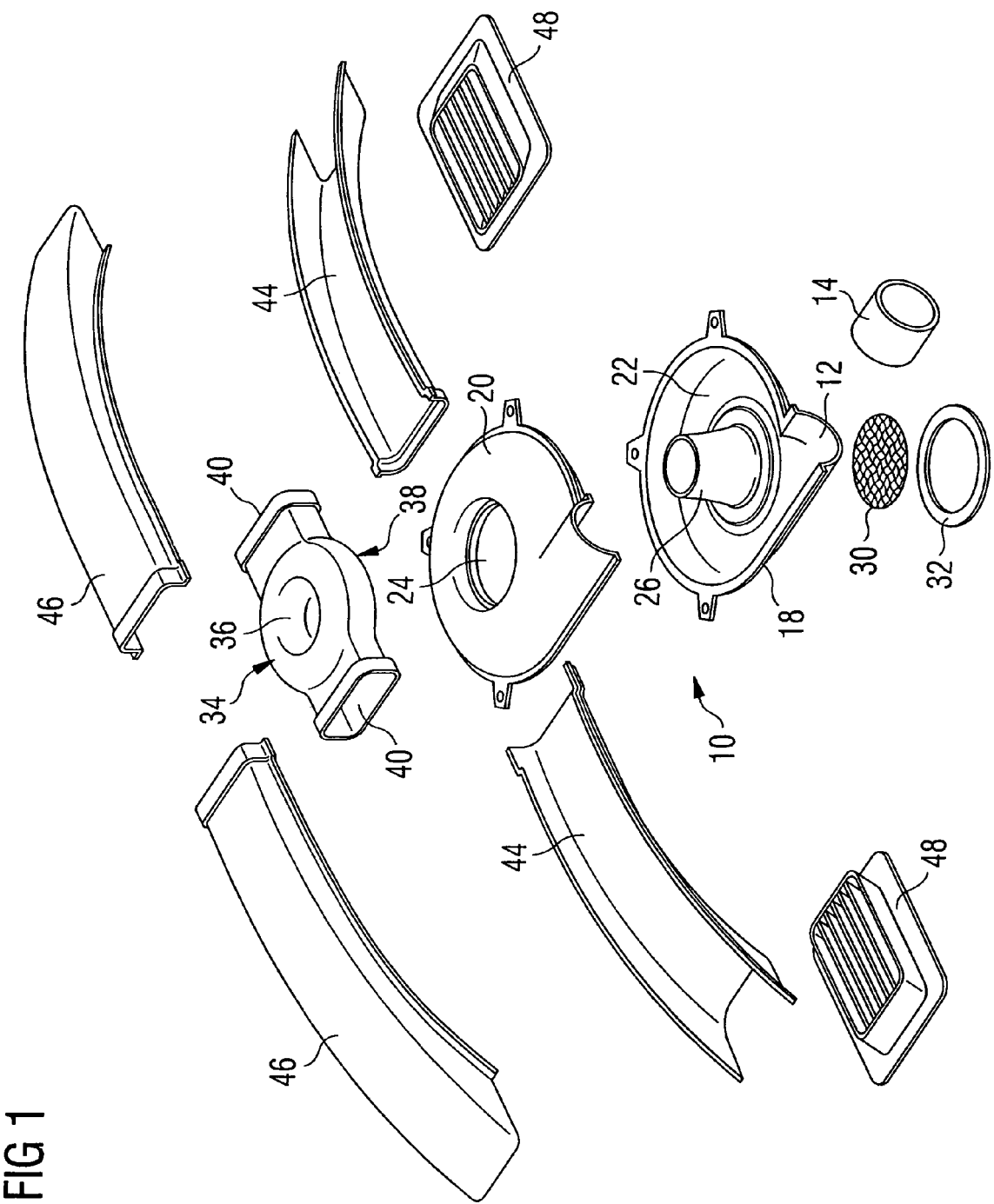
FIG. 1 shows a cyclone unit of an aircraft air conditioning system according to the invention in a three-dimensional and exploded representation.

FIG. 1 shows in a three-dimensional exploded representation a cyclone unit 10, the inlet opening 12 of which communicates with a fresh air supply line 14 of an aircraft air conditioning system. The supply line 14 conveys fresh air, which usually comes from a central air treatment unit (AGU=air generation unit) of the aircraft, to the cyclone unit 10.

Figure 2:
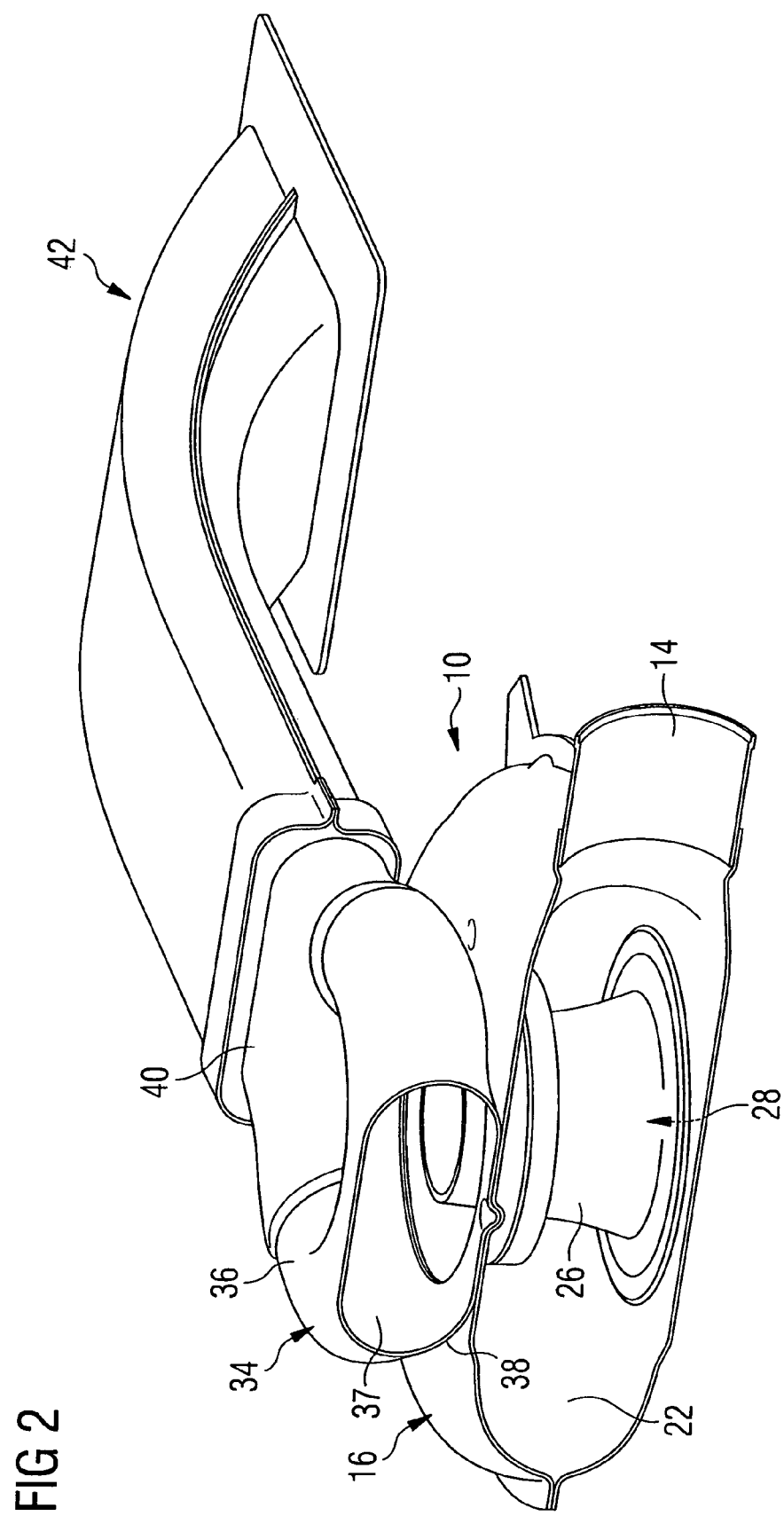
FIG. 2 is a three-dimensional representation, broken open transversely, of the cyclone unit from FIG. 1.

The cyclone unit 10 has a main body 16 (see FIG. 2) consisting of a lower part 18 and an upper part 20 (see FIG. 1) which together define a toroidal hollow space 22 in the interior of the main body 16. The upper part 20 has a central open region which forms an outlet opening 24 of the cyclone unit 10. A radially inner wall of the toroidal hollow space 22 is formed by a hollow truncated cone 26 which extends upwards from the bottom of the lower part 18 and ends approximately in the region of the outlet opening 24 (see in particular FIG. 2). In the represented embodiment, the hollow truncated cone 26 is formed integrally with the lower part 18.

Figure 3:
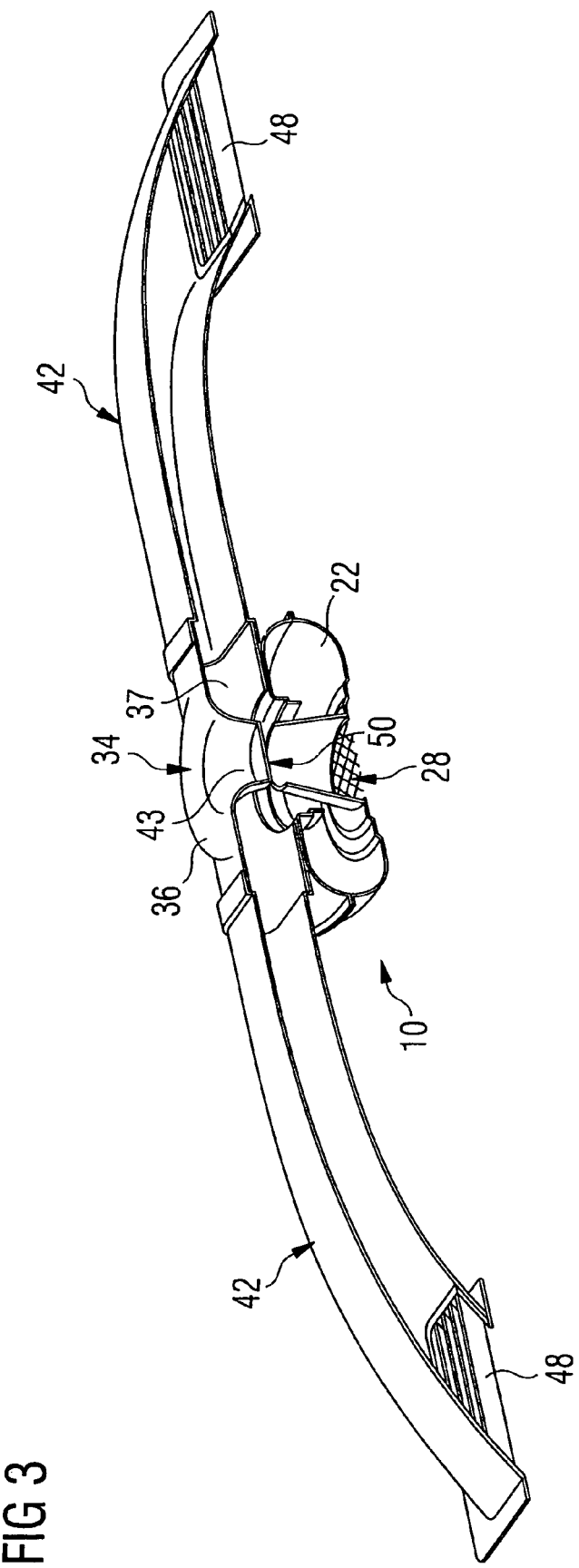
FIG. 3 is another three-dimensional representation, broken open longitudinally, of the cyclone unit from FIG. 1.

The maximum cross section, located in the region of the bottom of the lower part 18, of the hollow truncated cone 26 forms an intake opening 28 of the cyclone unit 10 which, for safety reasons, is spanned by a protective grille 30 which is fastened to a ring 32 at the lower part 18 (see FIGS. 1 and 3).

A distributor element 34 communicates directly with the outlet opening 24 of the cyclone unit 10, which element, in the represented example, is of integral construction and comprises a toroidal body 36 with a lower central opening 38 which faces the outlet opening 24 and communicates with the latter in the assembled state. Through the outlet opening 24 of the cyclone unit 10 and the lower opening 38 of the distributor element 34 the toroidal hollow space 22 is in fluid communication with an additional toroidal hollow space 37 formed in the interior of the toroidal body 36 (see FIGS. 2 and 3). Extending from the distributor element 34 in the illustrated embodiment, more specifically from the toroidal body 36 thereof are two flanges 40 arranged opposite to each other, which tap the additional toroidal hollow space 37 in the distributor element 34 and serve to fit a respective exhaust line 42, which lines extend substantially radially outwards from the toroidal body 36. An indentation 43 (see FIG. 3) is formed in a central region of the upper top face of the distributor element 34, which indentation extends into the distributor element 34 in the direction of the free end of the hollow truncated cone 26 of the cyclone unit 10.

Each exhaust line 42 is split horizontally and therefore consists of a lower exhaust line part 44 and an upper exhaust line part 46 (see FIG. 1). A discharger 48 is disposed at the free end of each exhaust line 42, being formed in the illustrated embodiment by a blow-out grille which is built into the opening formed at the free end of the exhaust line 42.

The operation of the cyclone unit 10 shall now be illustrated. Fresh air is supplied as incoming air to the cyclone unit 10 through the supply line 14. This incoming air flows through the inlet opening 12 tangentially into the toroidal hollow space 22 of the cyclone unit 10 and develops in the latter a cyclone-like flow. The cyclone flow generates in its radially inner centre, also called eye, a negative pressure which causes cabin air to be sucked into the cyclone unit 10 through the intake opening 28 and the hollow truncated cone 26. After the cabin air which has been sucked in has flowed through the free end of the hollow truncated cone 26, it strikes a face 50, plane in this case, which is formed by the central indentation 43 of the distributor element 34 and radially outwardly deflects the air which is sucked in and is to be recirculated.

The fresh air circulating in the toroidal hollow space 22 moves, while continuously circulating, through the outlet opening 24 of the cyclone unit 10 and the opening 38 of the distributor element upwards into the distributor element 34, where it meets the cabin air which is deflected by the face 50 and which has flowed through the intake opening 28 into the cyclone unit 10. The two air masses, fresh air and sucked-in cabin air, now circulate together in the additional toroidal hollow space 37, which is formed by the toroidal body 36 of the distributor element 34, and in the process mix intimately. There is accordingly also a cyclone flow in the additional toroidal hollow space 37.

The air which is mixed in this way leaves the distributor element 34 in the radial direction through the flanges 40 and flows through the exhaust lines 42 to the dischargers 48 and through these into the aircraft cabin.

All the components of the arrangement described above can be constructed inexpensively as plastics injection-moulded parts.

The invention claimed is:

1. An aircraft air conditioning system, comprising:
   at least one fresh air supply line for conveying fresh air into an aircraft cabin,
   a plurality of dischargers for blowing the fresh air from the at least one fresh air supply line into the aircraft cabin,
   a cyclone unit positioned proximate to at least one of the dischargers, the at least one discharger defining a subset of the plurality of dischargers in the aircraft, the subset of dischargers being fluidically coupled to the at least one fresh air supply line by the cyclone unit, wherein the cyclone unit includes:
   a main body including an inlet opening which communicates with the fresh air supply line, an intake opening through which cabin air is sucked in from the aircraft cabin, and an outlet opening, wherein the relative positioning of the inlet opening, the intake opening, and the outlet opening on the main body is configured such that a first cyclone flow is produced in the main body by only the fresh air during operation of the aircraft air conditioning system, and
   a distributor element coupled to the main body and communicating with the outlet opening, wherein the distributor element is positioned such that a second cyclone flow is produced in the distributor element by a mixture of the fresh air and the cabin air,
   wherein the cabin air is sucked in through the intake opening from the aircraft cabin and expelled together with the fresh air through the outlet opening.

2. The aircraft air conditioning system according to claim 1, wherein the intake opening communicates with the aircraft cabin via an intake duct.

3. The aircraft air conditioning system according to claim 1, wherein the intake opening communicates directly with the aircraft cabin.

4. The aircraft air conditioning system according to claim 1, wherein the main body is of horizontally split construction, having an upper part, which defines the outlet opening at an upper region, and a lower part, which, together with the upper part, defines a toroidal hollow space having a radially inner wall formed by a hollow truncated cone extending from the lower part upwards into the upper part and adjacent to region of the outlet opening.

5. The aircraft air conditioning system according to claim 4, wherein a maximum cross section of the hollow truncated cone forms the intake opening.

6. The aircraft air conditioning system according to claim 1, wherein the outlet opening communicates with at least two dischargers.

7. The aircraft air conditioning system according to claim 1, wherein each discharger communicates with the outlet opening through an exhaust line.

8. The aircraft air conditioning system according to claim 7, wherein each exhaust line includes an end which is opposite the discharger, the end communicating with the distributor element which communicates directly with the outlet opening.

9. The aircraft air conditioning system according to claim 8, wherein the distributor element comprises a toroidal body with a central opening communicating with the outlet opening, and wherein the exhaust lines extend radially outwards from the toroidal body.

10. The aircraft air conditioning system according to claim 9, wherein each exhaust line is of horizontally split formation.

11. The aircraft air conditioning system according to claim 1, wherein the cyclone unit is configured to operate as a separator for particles contained in the air.

12. An aircraft air conditioning system, comprising:
   at least one fresh air supply line for conveying fresh air into an aircraft cabin,
   a plurality of dischargers for blowing the fresh air from the at least one fresh air supply line into the aircraft cabin,
   a cyclone unit positioned proximate to at least one of the dischargers, the at least one discharger defining a subset of the plurality of dischargers in the aircraft, the subset of dischargers being fluidically coupled to the at least one fresh air supply line by the cyclone unit, wherein the cyclone unit includes:
      a main body including an inlet opening which communicates with the fresh air supply line, an intake opening defined by a hollow truncated cone through which cabin air is sucked in from the aircraft cabin, and an outlet opening, wherein the main body defines a first toroidal hollow space surrounding the hollow truncated cone and extending from the inlet opening to the outlet opening such that a first cyclone flow of only the fresh air is produced in the first toroidal hollow space, wherein the hollow truncated cone terminates adjacent the outlet opening such that the first cyclone flow is configured to form a localized area of negative pressure to draw the cabin air into the outlet opening, and
      a distributor element coupled to the main body and communicating with the outlet opening, the distributor element defining a second toroidal hollow space such that a second cyclone flow is produced in the distributor element by a mixture of the fresh air and the cabin air.

13. The aircraft air conditioning system of claim 12, wherein the second toroidal space surrounds an indentation formed in the distributor element, the indentation terminating proximate to the outlet opening such that the fresh air and the cabin air are forced to flow into and mix within the second toroidal hollow space.

* * * * *